US012623358B2

(12) United States Patent
Chou et al.

(10) Patent No.: US 12,623,358 B2
(45) Date of Patent: May 12, 2026

(54) TRANSFER BLADE FOR ROBOT

(71) Applicant: Taiwan Semiconductor Manufacturing Co., Ltd., Hsinchu (TW)

(72) Inventors: Chih-Wei Chou, Hsinchu (TW); Sheng-Yuan Lin, Hsinchu (TW); Yuan-Hsin Chi, Hsinchu (TW); Hung-Chih Wang, Hsinchu (TW); Yu-Chi Liu, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 1000 days.

(21) Appl. No.: 17/749,051

(22) Filed: May 19, 2022

(65) Prior Publication Data

US 2023/0373100 A1      Nov. 23, 2023

(51) Int. Cl.
B25J 15/00          (2006.01)
B25J 11/00          (2006.01)

(52) U.S. Cl.
CPC ....... B25J 15/0014 (2013.01); B25J 11/0095 (2013.01)

(58) Field of Classification Search
CPC ..................... B25J 15/0041; B25J 11/0095
See application file for complete search history.

(56) References Cited

U.S. PATENT DOCUMENTS

| | | | | |
|---|---|---|---|---|
| 5,004,399 | A * | 4/1991 | Sullivan | H01L 21/68 414/416.03 |
| 5,556,147 | A * | 9/1996 | Somekh | H01L 21/6838 294/185 |
| 5,746,460 | A * | 5/1998 | Marohl | H01L 21/68707 414/941 |
| 6,116,848 | A * | 9/2000 | Thomas | H01L 21/68707 414/754 |
| 6,187,103 | B1 * | 2/2001 | Huang | H01L 21/68707 414/935 |
| 6,206,441 | B1 * | 3/2001 | Wen | H01L 21/67259 414/941 |
| 6,283,701 | B1 * | 9/2001 | Sundar | H01L 21/68707 414/744.5 |
| 6,491,330 | B1 * | 12/2002 | Mankame | H01L 21/68707 294/196 |
| 7,055,875 | B2 * | 6/2006 | Bonora | H01L 21/6838 294/213 |

(Continued)

*Primary Examiner* — Monica E Millner
(74) *Attorney, Agent, or Firm* — Seed IP Law Group

(57) ABSTRACT
Z The present disclosure is directed to a transfer blade including a first end segment, a second end segment opposite to the first end segment, and an intermediate segment extending from the first end segment to the second end segment. The first end segment includes a first contact region and the second end segment includes a second contact region. The first and second contact regions are configured to contact locations of a surface of a workpiece that do not overlap or are not aligned with a sensitive area of the workpiece. The sensitive area of the workpiece may be an EUV frame or a reticle of the workpiece. A non-contact region extends continuously along the first end segment, the intermediate segment, and the second end segment, and the non-contact region overlaps the sensitive area of the workpiece and is spaced apart from the sensitive area of the workpiece.

20 Claims, 10 Drawing Sheets

(56)                    References Cited

U.S. PATENT DOCUMENTS

| | | | | |
|---|---|---|---|---|
| 7,300,082 B2 * | 11/2007 | Rogers | B25J 13/085 | |
| | | | 414/941 | |
| 7,644,968 B2 * | 1/2010 | Hirooka | H01L 21/68707 | |
| | | | 294/902 | |
| 8,864,202 B1 * | 10/2014 | Schrameyer | B25J 15/0014 | |
| | | | 294/902 | |
| 9,343,350 B2 * | 5/2016 | Arai | H01L 21/67742 | |
| 9,370,863 B2 * | 6/2016 | Tsuji | B25J 15/0014 | |
| 9,457,476 B2 * | 10/2016 | Chen | B25J 15/0014 | |
| 9,536,764 B2 * | 1/2017 | Embertson | H01L 21/67742 | |
| 10,403,530 B2 * | 9/2019 | Goto | B25J 18/04 | |
| 10,553,472 B2 * | 2/2020 | Bosboom | H01L 21/68 | |
| 10,699,931 B2 * | 6/2020 | Chen | B25J 11/0095 | |
| 10,796,940 B2 * | 10/2020 | Thaulad | H01L 21/67766 | |
| 2005/0036855 A1 * | 2/2005 | Garcia, Jr. | H01L 21/67742 | |
| | | | 414/217 | |
| 2007/0176445 A1 * | 8/2007 | Kim | H01L 21/67259 | |
| | | | 294/185 | |
| 2008/0099970 A1 * | 5/2008 | Kushida | H01L 21/67259 | |
| | | | 269/287 | |
| 2009/0096229 A1 * | 4/2009 | Bonora | H01L 21/6838 | |
| | | | 414/222.01 | |
| 2015/0287626 A1 * | 10/2015 | Arai | H01L 21/67742 | |
| | | | 294/213 | |
| 2019/0148210 A1 * | 5/2019 | Shibata | B25J 15/0033 | |
| | | | 294/103.1 | |
| 2024/0010444 A1 * | 1/2024 | Saito | B65G 47/915 | |

* cited by examiner

800

Align a transfer blade of a transfer robot with a workpiece at a first location

802

Contact the workpiece with one or more respective surfaces of one or more contact regions of the transfer blade

804

Transfer the workpiece from the first location to a second location different from the first location

806

TRANSFER BLADE FOR ROBOT

BACKGROUND

Generally, in the manufacture of semiconductor devices, robots are often utilized to transfer a workpiece, such as a silicon wafer, between various processing apparatuses such as processing tools. In some system architectures, a workpiece carrier is mounted to an arm of the robot, wherein the workpiece carrier is configured to transport the workpiece between the processing apparatuses. The workpiece carrier may be a transfer blade of the robot that picks up and supports the workpiece while transferring the workpiece within the processing apparatus or between processing apparatuses.

For example, as discussed above, one common workpiece carrier includes a transfer or robot blade coupled to an end of the robot, wherein the workpiece rests on the robot blade during transportation thereof by the robot. Typically, gravity maintains the position of the workpiece with respect to the robot blade. As such, inertial forces of the workpiece with respect to the robot blade tend to limit a speed of travel of the robot blade. Further conventional approaches include a vacuum source on the robot arm, wherein the robot blade utilizes the vacuum source to maintain the position of the workpiece relative to the robot blade. For example, the vacuum source is plumbed to the robot blade in order to selectively provide a vacuum to an interface between the workpiece and the robot blade, thereby selectively fixing the position of the workpiece with respect to the robot blade. Furthermore, electrostatic forces are used to attract a workpiece to a workpiece retaining surface of a robot blade, which is typically made of a dielectric.

BRIEF DESCRIPTION OF THE DRAWINGS

Aspects of the present disclosure are best understood from the following detailed description when read with the accompanying figures. In the drawings, identical reference numbers identify similar elements or acts unless the context indicates otherwise. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
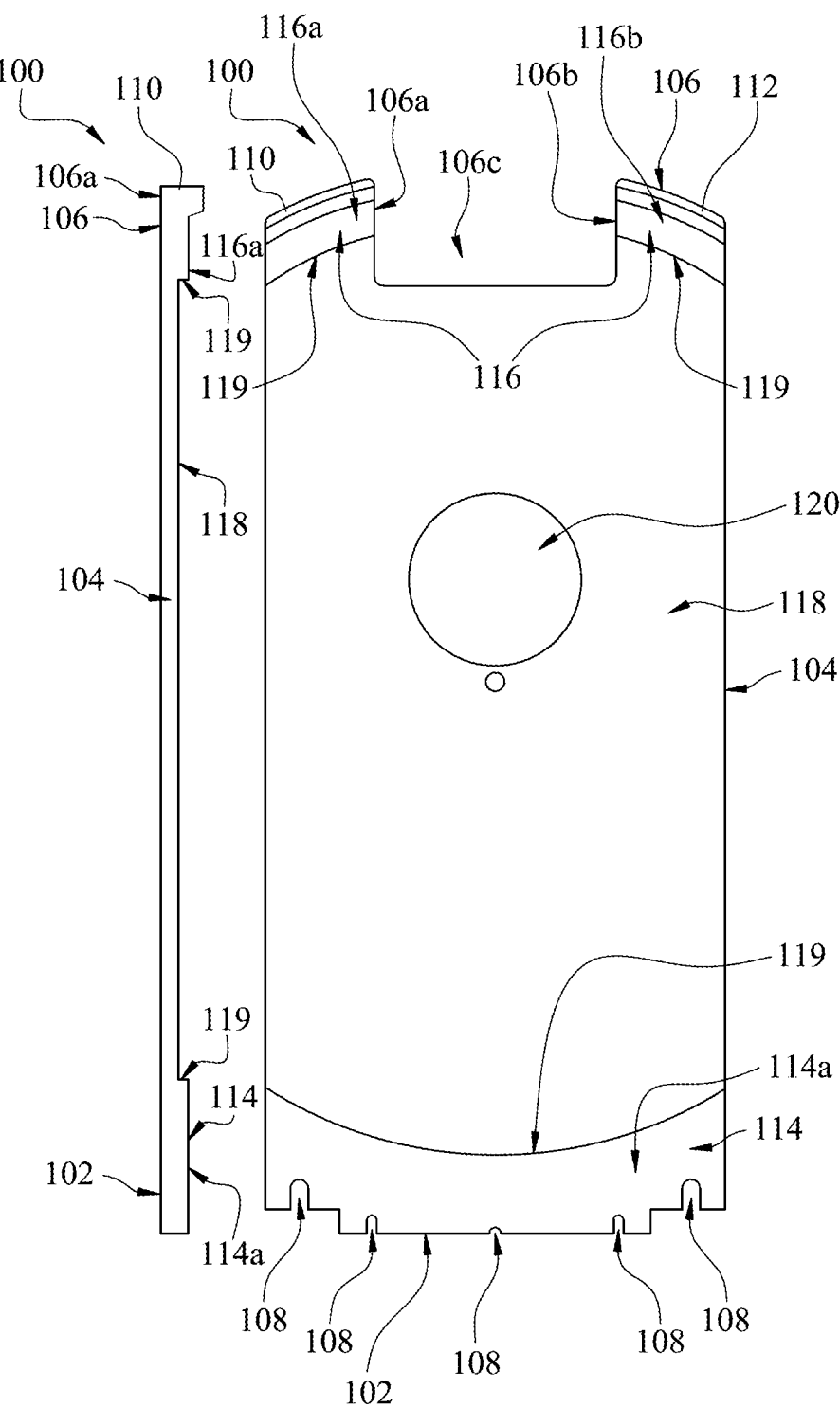
FIG. 1 illustrates an example of a transfer blade.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "left," "right," "horizontal," "vertical," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is directed to a transfer blade 100 that may be present on a robot for transferring a workpiece or tool component, which may be a wafer, a silicon wafer, a pattern reticle, a pattern reticle wafer, an extreme-ultraviolet (EUV) reticle, a wafer with an EUV frame region, a tool component with an EUV reticle, or some other similar or like type of workpiece or tool component that may be transferred by the transfer blade 100. The image at the left of FIG. 1 is a right side view of the transfer blade 100. The image at the right of FIG. 1 is a top plan view of the transfer blade 100. The details of the transfer blade 100 will be discussed in detail as follows herein with respect to FIG. 1 and in comparison with embodiments of transfer blades as described within the present disclosure or within the scope of the present disclosure. For example, the transfer blade 100 will be discussed as a comparison to an embodiment of a transfer blade 300 of the present disclosure as illustrated in FIGS. 3A-3E.

As shown in FIG. 1, the transfer blade 100 includes a first end segment 102, an intermediate segment 104, and a second end segment 106 opposite to the first end segment 102. The intermediate segment 104 extends from the first end segment 102 to the second end segment 106 such that the intermediate segment 104 is between the first end segment 102 and the second end segment 106. The intermediate segment 104 may be referred to as a central segment, a middle segment, or some other similar or like type of reference to the intermediate segment 104 of the transfer blade 100.

The first end segment 102 includes one or more slots 108 that are utilized to mount the transfer blade 100 to a transfer robot that utilizes the transfer blade to move a workpiece or a tool component within a processing apparatus. For example, the slots 108 may receive fasteners to mount or couple the transfer blade 100 to the transfer robot. The slots 108 may assist in aligning the transfer blade 100 in a preferred position when mounting the transfer blade 100 to the transfer robot.

The second end segment 106 includes a first extension 106a and a second extension 106b that is spaced apart from the first extension 106a by a space 106c that extends from the first extension 106a to the second extension 106b. In other words, the space 106c is between the first extension 106a and the second extension 106b and separates the first extension 106a from the second extension 106b and vice versa.

The first extension 106a includes a first hook 110 that is curved, and the second extension 106b includes a second hook 112 that is curved. When a workpiece or tool component (not shown) is present on the conventional transfer blade 100, the first and second hooks 110, 112, respectively, abut an edge of the workpiece or tool component such that the workpiece or tool component does not fall off of the transfer blade 100. As may be readily seen in FIG. 1, the first and second hooks 110, 112 are curved to follow a curved profile of the workpiece or tool component being transferred by the transfer blade 100. In other words, the first and second hooks 110, 112 of the first and second extensions 106a, 106b are configured to be stoppers to delimit movement of the workpiece or tool component when being transferred from a first location to a second location by the transfer blade 100.

The first end segment 102 includes a first contact region 114 and the second end segment 106 includes a second contact region 116. The first contact region 114 is spaced apart from the second contact region 116 by the intermediate segment 104 extending from the first end segment 102 to the second end segment 106.

A first surface 116a of the second contact region 116 is present at the first extension 106a and a second surface 116b of the second contact region 116 is present at the second extension 106b. The first and second surfaces 116a, 116b of the first and second extensions 106a, 106b may be referred to as raised surfaces, upper surfaces, or some other similar or like type of reference to the first and second surfaces 116a, 116b at the first and second extensions 106a, 106b. A third surface 114a of the first contact region 114 is present at the first end segment 102. Similar to the first surface 116a and the second surface 116b, the third surface 114a may be referred to as a raised surface, an upper surface, or some other similar or like type of reference to the third surface 114a at the first contact region 114 of the first end segment 102.

A fourth surface 118 of the intermediate segment 104 extends from the first end segment 102 to the second end segment 106. The fourth surface 118 is recessed with respect to the first, second, and third surfaces 116a, 116b, 114a of the first and second end segments 102, 106. The fourth surface 118 may be referred to as a recessed surface, a lower surface, or some other similar or like type of reference to the fourth surface 118 of the intermediate segment 104. The fourth surface 118 extends partially onto the first and second extensions 106a, 106b, respectively, such that the fourth surface 118 extends continuously from the first end segment 102 along the intermediate segment 104 to the second end segment 106. The fourth surface 118 terminates at the first surface 116a, at the second surface 116b, and the third surface 114a such that respective sidewalls 119 extend from the fourth surface 118 to the first surface 116a, the second surface 116b, and the third surface 114a, respectively.

The transfer blade 100 further includes a through hole 120 that extends entirely through the intermediate segment 104. The through hole 120 may be aligned with a vacuum source on a transfer robot to which the transfer blade 100 is mounted. The vacuum source on the robot arm may be utilized to maintain a position of a workpiece or tool component present on the transfer blade 100 to be transferred from a first location to a second location utilizing the robot blade mounted to the transfer robot.

When in use, the transfer blade 100 picks up a workpiece or tool component by contacting a surface, which may be a backside surface, of the workpiece or tool component. The respective surfaces 116a, 116b, 114a at the first and second contact regions 114, 116 of the first and second end segments 102, 106, respectively, physically contact the surface of the workpiece or tool component and support the workpiece or tool component while transferring the workpiece or tool component from a first location to a second location different from the first location. For example, the first and second surfaces 116a, 116b of the second contact region 116 physically contact the surface of the workpiece or tool component, and the third surface 114a of the first contact region 114 physically contacts the surface of the workpiece or tool component. Once the first, second, and third surfaces 116a, 116b, 114a are brought into physical contact with the surface of the workpiece or the tool component, the workpiece or tool component is moved from the first location to the second location when the transfer blade 100 is mounted to a transfer robot.

When transferring the workpiece or tool component, gravity maintains the position of the workpiece or tool component with respect to the transfer blade 100. As such, inertial forces of the workpiece or tool component with respect to the transfer blade 100 tend to limit a speed of travel of the transfer blade 100. Furthermore, electrostatic forces may be used to attract the workpiece or tool component to a workpiece or tool component retaining surface of the transfer blade 100, which may include a dielectric material. These workpiece or tool component retaining surfaces of the transfer blade 100 may be the first, second, and third surfaces 116a, 116b, 114a. For example, the first, second, and third surfaces 116a, 116b, 114a may be coated with a dielectric material.

Similar to the first, second, and third surfaces 116a, 116b, 114a contacting the surface of the workpiece or the tool component, inner sidewalls of the first and second hooks 110, 112 contact an edge of the workpiece or tool component to delimit movement of the workpiece or tool component when transferring the workpiece or tool component from a first location to a second location different from the first location.

Unlike the first, second, and third surfaces 116a, 116b, 114a physically contacting the surface of the workpiece or tool component, the fourth surface 118 is spaced apart from the surface (e.g., backside surface) of the workpiece or tool component such that the fourth surface 118 does not contact the surface of the workpiece or tool component. In other words, the fourth surface 118 may be present at a non-contact region of the transfer blade 100 that does not physically contact the surface of the workpiece or tool component. To summarize, when transferring the workpiece or tool component from a first location to a second location with the transfer blade 100, the first, second, and third surfaces 116a, 116b, 114a are raised surfaces that physically contact the surface of the workpiece or tool component whereas the fourth surface 118 is a recessed surface that is spaced apart from the surface of the workpiece or tool component such that the fourth surface 118 does not physically contact the surface of the wokrpiece or tool component. The fourth surface 118 may be aligned with and overlap a sensitive area or portion of the workpiece or tool component to reduce the likelihood of defects (e.g., scratches, indentations, or other similar or like damage or defects) occurring at the surface of the workpiece or tool component aligned with the sensitive area or portion.

Figure 2:
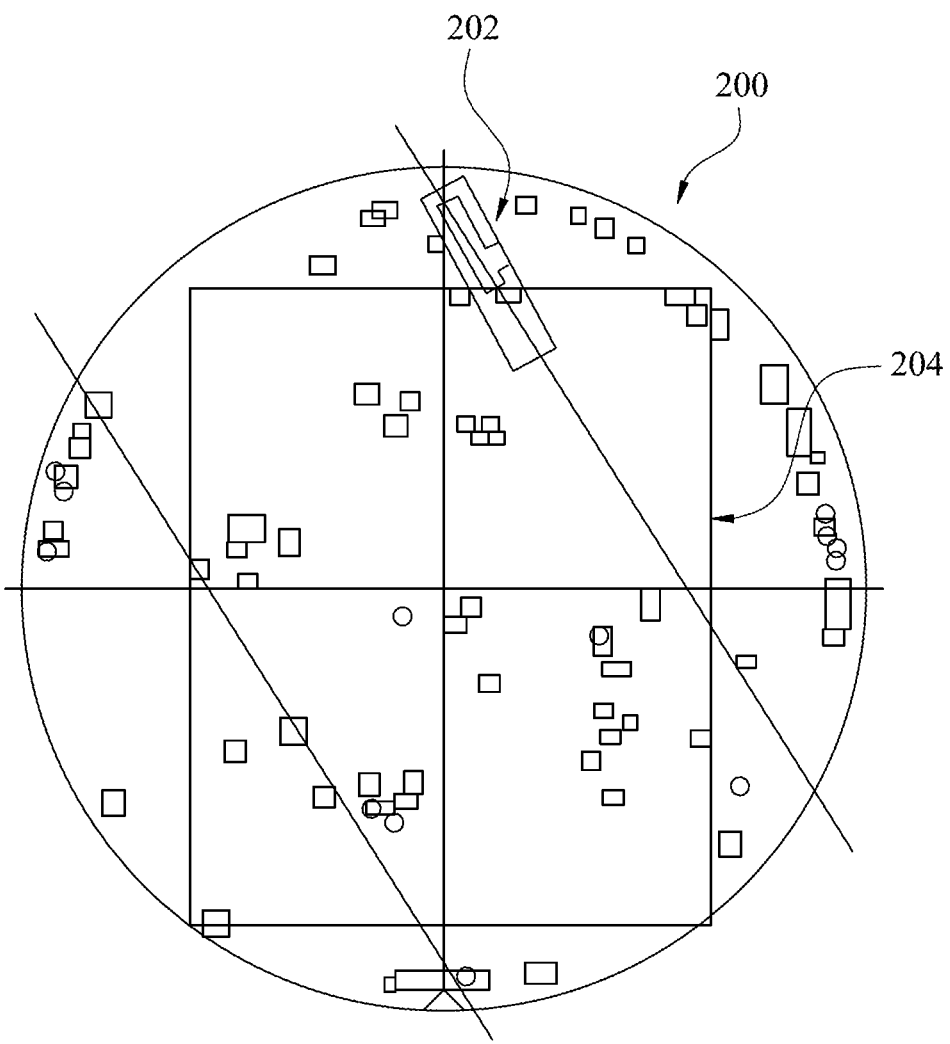
FIG. 2 illustrates an example of a defect map of defects on a backside surface of a workpiece as a result of utilizing the transfer blade shown in FIG. 1.

FIG. 2 shows locations of defects that may result on a backside surface of a workpiece or tool component 200 due to the first, second, and third surfaces 116a, 116b, 114a contacting the backside surface of the workpiece or tool component 200. The workpiece or tool component 200 will be referred to as a workpiece 200 herein.

The defects at the backside surface of the workpiece 200 may be scratches such as indentations, recesses, or some other type of defect that may be a result of debris being present on the first, second, and third surfaces 116a, 116b, 114a when the first, second, and third surfaces 116a, 116b, 114a are brought into contact with the backside surface of the workpiece 200. For example, in a defect region 202 as shown in FIG. 2, a number of defects are present and overlap a sensitive or critical region or portion 204 of the workpiece 200. For example, the sensitive or critical region 204 may be an extreme-ultraviolet (EUV) frame, an EUV reticle, or some other sensitive or critical region or portion of the workpiece 200.

When the sensitive or critical region 204 is an EUV frame region of a workpiece, that is being processed and refined by the utilization of various tools to manufacture semiconductor devices, e.g., the portion of the wafer surface that is exposed to EUV radiation in the EUV photolithography tool, the defect region 202 overlapping into the sensitive or critical region 204 may result in the manufacturing of defective semiconductor devices that do not function within selected tolerances, which may have been selected by a manufacturer depending on a situation of use of the semiconductor devices. In other words, the defect region 202 may result in several semiconductor devices being manufactured that are not readily usable as the defects at the defect region 202 may result in the semiconductor devices being defective (e.g., do not function within the selected tolerances). In view of this discussion, reducing a likelihood of the defects caused by the transfer blade 100 due to debris or rubbing of the transfer blade 100 against the backside surface of the workpiece 200 is desirable. As will become readily apparent in view of the following discussion of the present disclosure herein, a transfer blade 300 of the present disclosure is advantageous over the transfer blade 100.

Figure 3A:
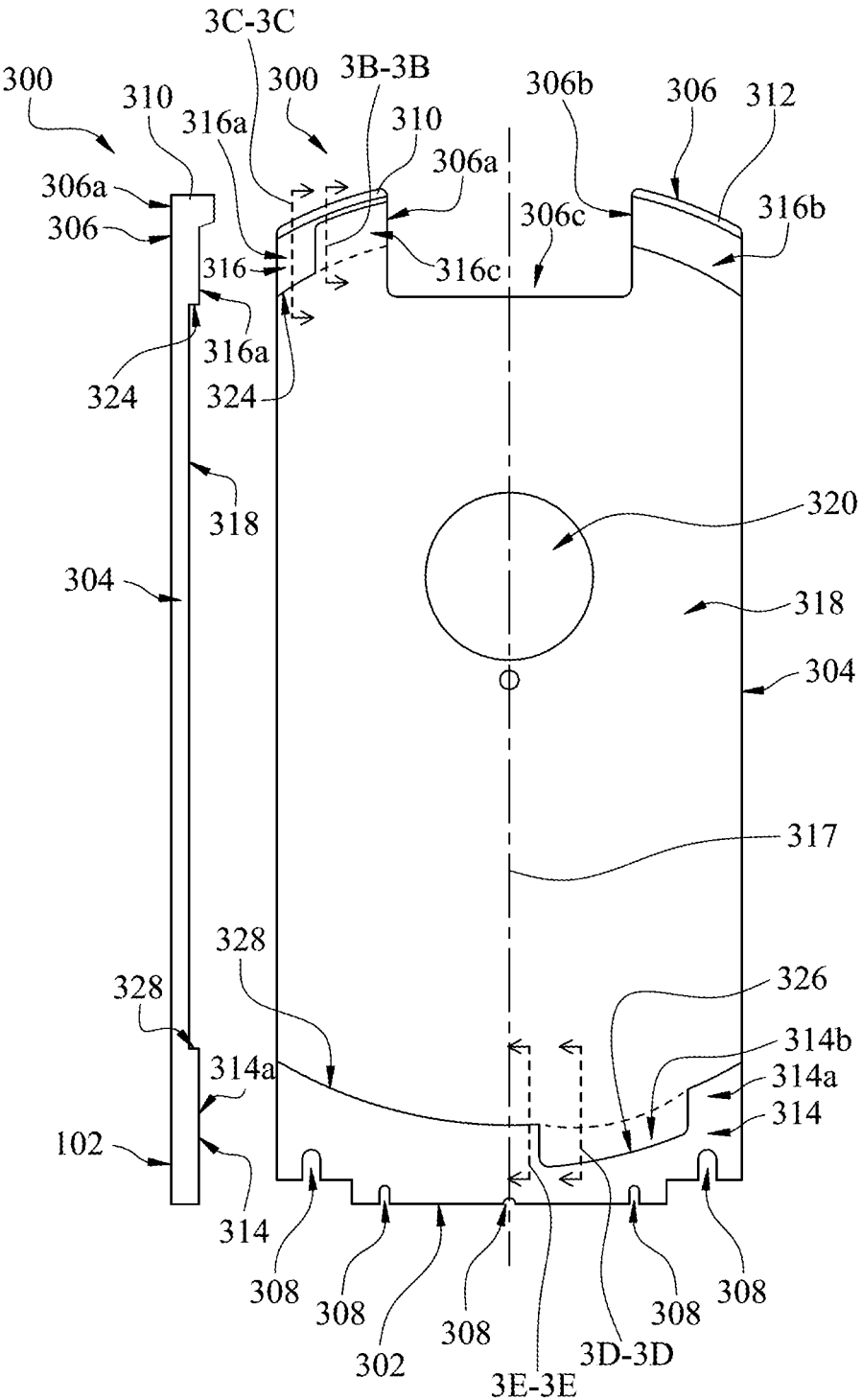
FIG. 3A illustrates an example of a transfer blade, in accordance with some embodiments of the present disclosure.

FIG. 3A illustrates an embodiment of a transfer blade 300, in accordance with the present disclosure. The transfer blade 300 is similar to the transfer blade 100 as shown in FIG. 1. However, there are differences between the transfer blade 300 and the transfer blade 100, which will be discussed in detail within the present disclosure.

As shown in FIG. 3A, the transfer blade 300 includes a first end segment 302, an intermediate segment 304, and a second end segment 306 opposite to the first end segment 302. The first end segment 302, the intermediate segment 304, and the second end segment 306, respectively, of the transfer blade 300 as shown in FIG. 3A are similar to the first end segment 102, the intermediate segment 104, and the second end segment 106 of the transfer blade 100 as shown in FIG. 1.

The intermediate segment 304 of the transfer blade 300 as shown in FIG. 3A extends from the first end segment 302 to the second end segment 306 such that the intermediate segment 304 is between the first end segment 302 and the second end segment 306. The intermediate segment 304 may be referred to as a central segment, a middle segment, or some other similar or like type of reference to the intermediate segment 304 of the transfer blade 300.

The first end segment 302 includes one or more slots 308 that are utilized to mount the transfer blade 300 to a transfer robot that utilizes the transfer blade 300 to move a workpiece or a tool component within a processing apparatus. For example, the slots 308 may receive fasteners to mount or couple the transfer blade 300 to the transfer robot. The slots 308 may assist in aligning the transfer blade 300 in a preferred position when mounting the transfer blade 300 to the transfer robot.

The second end segment 306 includes a first extension 306a and a second extension 306b that is spaced apart from the first extension 306a by a space 306c that extends from the first extension 306a to the second extension 306b. In other words, the space 306c is between the first extension 306a and the second extension 306b, and separates the first extension 306a from the second extension 306b and vice versa.

The first extension 306a includes a first hook 310 that is curved, and the second extension 306b includes a second hook 312 that is curved. When a workpiece or tool component (not shown) is present on the transfer blade 300, the first and second hooks 310, 312, respectively, abut an edge of the workpiece or tool component such that the workpiece or tool component does not fall off of the transfer blade 300 when being transferred from a first location to a second location different from the first location. As may be readily seen in FIG. 3A, the first and second hooks 310, 312 are curved to follow a curved profile (e.g., circular) of the workpiece or tool component being transferred by the transfer blade 300. In other words, the first and second hooks 310, 312, respectively, of the first and second extensions 306a, 306b, respectively, are configured to act as stoppers to delimit movement of the workpiece or tool component when being transferred from the first location to the second location by the transfer blade 300.

The first end segment 302 includes a first contact region 314, and the second end segment 306 includes a second contact region 316. The first contact region 314 may be referred to as a first raised contact region, and the second contact region 316 may be referred to a second raised contact region. A first surface 316a of the second contact region 316 is present at the first extension 306a and a second surface 316*b* of the second contact region 316 is at the second extension 306*b*. The first and second surfaces 316*a*, 316*b* of the first and second extensions 306*a*, 306*b* may be referred to as raised surfaces, upper surfaces, or some other similar or like type of reference to the first and second surfaces 316*a*, 316*b* of the first and second extensions 306*a*, 306*b* of the transfer blade 300. The first surface 316*a* is spaced apart from the space 306*c* whereas the second surface 316*b* is directly adjacent to the space 306*c*.

The second end segment 306 further includes a third surface 316*c* that is directly adjacent to the space 306*c* and on an opposite side of the space 306*c* relative to the second surface 316*b*. In other words, the third surface 316*c* present at the first extension 306*a* of the second end segment 306 is spaced apart from the second surface 316*b* by the space 306*c*. The third surface 316*c* is recessed relative to the first surface 316*a* of the first extension 306*a* of the second end segment 306 such that the third surface 316*c* is spaced apart from a surface of a workpiece and the first and second surfaces 316*a*, 316*b* contact the surface of the workpiece when the workpiece is present on the transfer blade 300. In other words, a thickness T1 of the transfer blade 300 at the third surface 316*c* (e.g., a first thickness T1) is less than thicknesses T2 of the transfer blade 300 (e.g., second thickness T2) at the first surface 316*a* and the second surface 316*b*, respectively. In some embodiments, the thicknesses T2 of the transfer blade 300 at the first surface 316*a* and the second surface 316*b* may be substantially equal to each other.

In some embodiments, thicknesses of the transfer blade 300 at the first surface 316*a* and the second surface 316*b* may be different from each other. However, while these thicknesses may be different, the first surface 316*a* and the second surface 316*b* will be level or coplanar with each other such that a workpiece remains level or horizontal due to gravity when present on the transfer blade 300.

The third surface 316*c* extends from the first surface 316*a* to the space 306*c* and is directly adjacent to the first hook 310 of the first extension 306*a*. As may readily be seen in FIG. 3A, the third surface 316*c* may have a surface area that is larger than a surface area of the first surface 316*a*, and the surface area of the third surface 316*c* may be less than a surface area of the second surface 316*b*. In alternative embodiments of the transfer blade 300, sizes and shapes of the first, second, and third surfaces 316*a*, 316*b*, 316*c* of the second contact region 316 of the second end segment 306 may be adjusted depending on a size and shape of a workpiece or tool component being transferred by the transfer blade 300. For example, a size and shape of a sensitive or critical region or portion of the workpiece or tool component may be a defining factor in determining the size and shape of the first, second, and third surfaces 316*a*, 316*b*, 316*c* of the second contact region 316.

The first end segment 302 includes a fourth surface 314*a* and a fifth surface 314*b*. Similar to the first and second surfaces 316*a*, 316*b*, the fourth surface 314*a* may be referred to as a raised surface, an upper surface, or some other similar or like type of reference to the fourth surface 314*a* at the first contact region 114 of the first end segment 302. Similar to the third surface 316*c*, the fifth surface 314*b* may be referred to as a recessed surface, a lower surface, or some other similar or like type of reference to the fifth surface 314*b* at the first contact region 114 of the first end segment 302. In some embodiments, the fourth surface 314*a* may be separated into two separate and distinct surfaces that are separated from each other by the fifth surface 314*b*.

The fifth surface 314*b* extends into the fourth surface 314*a* as shown in the top plan view in FIG. 3A, and the fifth surface 314*b* is recessed relative to the fourth surface 314*a*. In other words, the thickness T1 of the transfer blade 300 at the fifth surface 314*b* is less than a thickness of the transfer blade 300 at the fourth surface 314*a* such that the transfer blade 300 is thicker at the fourth surface 314*a* than at the fifth surface 314*b*. The thickness of the transfer blade 300 at the fourth surface 314*a* may be substantially equal to the thicknesses of the transfer blade 300 at the first and second surfaces 316*a*, 316*b*, respectively. The thickness of the transfer blade 300 at the fifth surface 314*b* may be substantially equal to the thickness of the transfer blade 300 at the third surface 316*c*.

The transfer blade 300 includes a center line or axis 317 that extends vertically based on the orientation as shown in the top plan view of the transfer blade 300 as illustrated in FIG. 3A. The third surface 316*c* and the fifth surface 314*b* is offset relative to the center axis 317. For example, in this embodiment of the transfer blade 300, the third surface 316*c* is offset to the left of the center axis 317 as illustrated in FIG. 3A, and the fifth surface 314*b* is offset to the right of the center axis 317 as illustrated in FIG. 3A. In other words, the third surface 316*c* is on an opposite side of the center axis 317 relative to the fifth surface 314*b*.

In an alternative embodiment of the transfer blade 300, the third surface 316*c* may instead be present on the second extension 306*b* instead of the first extension 306*a* such that the third surface 316*c* is on the right-hand side of the center axis 317, and the fifth surface 314*b* may instead be present on the left-hand side of the center axis 317 while still extending into the fourth surface 314*a*. In yet another alternative embodiment of the transfer blade 300, the third surface 316*c* may be on the second extension 306*b* instead of the first extension 306*a* such that the third surface 316*c* is on the right-hand side of the center axis 317, and the fifth surface 314*b* may be present on the right-hand side of the center axis 317 as shown in FIG. 3A such that both the third and fifth surfaces 316*c*, 314*b* are on the same side of the center axis 317.

In an alternative embodiment of the transfer blade 300, an additional recessed surface similar to the third surface 316*c* may also be present at the second extension 306*b* such that the additional recessed surface extends into the second surface 316*b*. In other words, the third surface 316*c* may be present on the first extension 306*a* and the additional recessed surface may be present on the second extension 306*b* such that the second end segment 306 is a mirror image about the center axis 317.

In an alternative embodiment of the transfer blade 300, an additional recessed surface similar to the fifth surface 314*b* may also be present on the left-hand side of the center axis 317, and the additional recessed surface extends into the fourth surface 314*a* similar to the fifth surface 314*b*. In other words, the first end segment 302 is a mirror image about the center axis 317.

In an alternative embodiment of the transfer blade 300, the fifth surface 314*b* may extend across the center axis 317. In other words, a first portion of the fifth surface 314*b* may be present on the right-hand side of the center axis 317 and a second portion of the fifth surface 314*b* may be present on the left-hand side of the center axis 317. In some embodiments, the first portion and the second portion of the fifth surface 314*b* may be mirror images of each other about the center axis 317. In some other embodiments, the first portion and the second portion of the fifth surface 314*b* may be asymmetrical about the center axis 317.

While the embodiment of the transfer blade 300 as shown in FIGS. 3A-3E includes both the third and the fifth surfaces 316*c*, 314*b*, in some alternative embodiments, the transfer blade 300 may only include one or the other of the third surface 316*c* and the fifth surface 314*b*. In other words, in one alternative embodiment of the transfer blade 300, the fifth surface 314*b* may not be present such that only the fourth surface 314*a* is present at the first end segment 302, and, in another alternative embodiment of the transfer blade 300, the third surface 316*c* may not be present at the first extension 306*a* such that only the first surface 316*a* is present at the first extension 306*a*.

A sixth surface 318 of the intermediate segment 304 extends from the first end segment 302 to the second end segment 306. The sixth surface 318 is recessed with respect to the first, second, and fourth surfaces 316*a*, 316*b*, 314*a* of the first and second end segments 302, 306, respectively. The sixth surface 318 may be referred to as a recessed surface, a lower surface, or some other similar or like type of reference to the sixth surface 318 of the intermediate segment 304. The sixth surface 318 extends partially onto the first and second extensions 306*a*, 306*b*, respectively, such that the sixth surface 318 extends continuously and unimpeded from the first end segment 302 along the intermediate segment 304 to the second end segment 306.

As shown in FIG. 3A, the third surface 316*c* at the first extension 306*a*, the fifth surface 314*b* at the first end segment 302, and the sixth surface 318 along the intermediate segment 304 are a single continuous surface that extends unimpeded from the first end segment 302 along the intermediate segment 304 to the second end segment 306. In other words, the third surface 316*c*, the fifth surface 314*b*, and the sixth surface 318 are a single, unitary, and continuous surface such that the transfer blade 300 has a thickness that remains substantially consistent along the third surface 316*c*, the fifth surface 314*b*, and the sixth surface 318.

The third surface 306*c*, the fifth surface 314*b*, and the sixth surface 318 may extend along a recessed region of the transfer blade 300 as shown in FIG. 3A. The recessed region of the transfer blade 300 is recessed relative to the first and second contact regions 306, 314, which may be referred to as respective raised contact regions of the transfer blade 300.

A through hole 320 is aligned with the center axis 317 and extends entirely through the intermediate segment 304. The through hole 320 may be aligned with a vacuum source on a transfer robot to which the transfer blade 300 is mounted. The vacuum source on the robot arm may be utilized to maintain a position of a workpiece or tool component present on the transfer blade 300 to be transferred from a first location to a second location utilizing the robot blade mounted to the transfer robot.

When in use, the transfer blade 300 picks up a workpiece or tool component by contacting a surface, which may be a backside surface, of the workpiece or tool component similar to how the transfer blade 100 contacts the surface of the workpiece as discussed earlier herein. However, unlike the transfer blade 100, the first surface 316*a*, the second surface 316*b*, and the fourth surface 314*a* contact the surface of the workpiece or tool component. Furthermore, unlike the transfer blade 100, the third surface 316*c*, the fifth surface 314*b*, and the sixth surface 318 do not contact the surface (e.g., backside surface) of the workpiece or tool component. In other words, the respective surfaces at the first and second contact regions 314, 316 of the first and second end segments 302, 306, respectively, physically contact the surface of the workpiece or tool component and supports the workpiece and tool component while transferring the workpiece or tool component from a first location to a second location different from the first location.

For example, the first, second, and fourth surfaces 316*a*, 316*b*, 314*a* of the first and second contact regions 314, 316 physically contact the surface of the workpiece or tool component, and the third, fifth, and sixth surfaces 316*c*, 314*b*, 318 do not physically contact the surface of the workpiece or tool component. In other words, the third, fifth, and sixth surfaces 316*c*, 314*b*, 318 may be present at a non-contact region of the transfer blade 300 that does not physically contact the surface of the workpiece or tool component when being transferred from the first location to the second location. Once the first, second, and fourth surfaces 316*a*, 316*b*, 314*a* are brought into contact with the surface of the workpiece or tool component, the workpiece or tool component is moved from the first location to the second location when the transfer blade 300 is mounted to a transfer robot. To summarize, the first, second, and fourth surfaces 316*a*, 316*b*, 314*a* are raised surfaces that contact the surface of the workpiece or tool component whereas the third, fifth, and sixth surfaces 316*c*, 314*b*, 318 are recessed surfaces that are spaced apart from the surface of the workpiece or tool component and do not contact the surface of the workpiece or tool component when moving the workpiece or tool component.

The third, fifth, and sixth surfaces 316*c*, 314*b*, 318 may be aligned with and overlap sensitive or critical regions or portions of the workpiece or tool component to reduce the likelihood of defects (e.g., scratches, indentations, or other similar or like damage or defects) occurring at the surface of the workpiece or tool component overlapping or aligned with the sensitive or critical regions or portions of the workpiece or tool component due to the surface of the workpiece or tool component contacting the third, fifth, and sixth surfaces 316*c*, 314*b*, 318. The likelihood of defects at locations on the surface that overlap or are aligned with the sensitive or critical regions or portions of the workpiece or tool component is reduced as the third, fifth, and sixth surfaces 316*c*, 314*b*, 318 are spaced apart from and do not contact locations of the surface of the workpiece or tool component that overlap or are aligned with the sensitive or critical regions or portions of the workpiece or tool component.

Similar to the first and second hooks 110, 112 of the transfer blade 100 as discussed earlier herein, inner sidewalls of the first and second hooks 310, 312 physically contact and abut an edge of the workpiece or tool component to delimit movement of the workpiece or tool component when transferring the workpiece or tool component from a first location to a second location different from the first location.

When in use, the transfer blade 300 picks up a workpiece or tool component by contacting a surface, which may be a backside surface, of the workpiece or tool component. The respective surfaces 316*a*, 316*b*, 314*a* at the first and second contact regions 314, 316 of the first and second end segments 302, 306, respectively, physically contact the surface of the workpiece or tool component and supports the workpiece or tool component while transferring the workpiece or tool component from a first location to a second location different from the first location. For example, the first, second, and fourth surfaces 316*a*, 316*b*, 314*a* of the first and second contact regions 314, 316 physically contact the surface of the workpiece or tool component. Once the first, second, and fourth surfaces 316*a*, 316*b*, 314*a* are brought into physical contact with the surface of the workpiece or the tool component, the workpiece or tool component is moved from the first location to the second location when the transfer blade 300 is mounted to a transfer robot.

When transferring the workpiece or tool component, gravity maintains the position of the workpiece or tool component with respect to the transfer blade 300. As such, inertial forces of the workpiece or tool component with respect to the transfer blade 300 tend to limit a speed of travel of the transfer blade 100. Furthermore, electrostatic forces may be used to attract the workpiece or tool component to a workpiece or tool component retaining surface of the transfer blade 300, which may include a dielectric material. These workpiece or tool component retaining surfaces of the transfer blade 300 may be the first, second, and fourth surfaces 316*a*, 316*b*, 314*a*. For example, the first, second, and fourth surfaces 316*a*, 316*b*, 314*a* may be coated with a dielectric material.

Figure 3B:
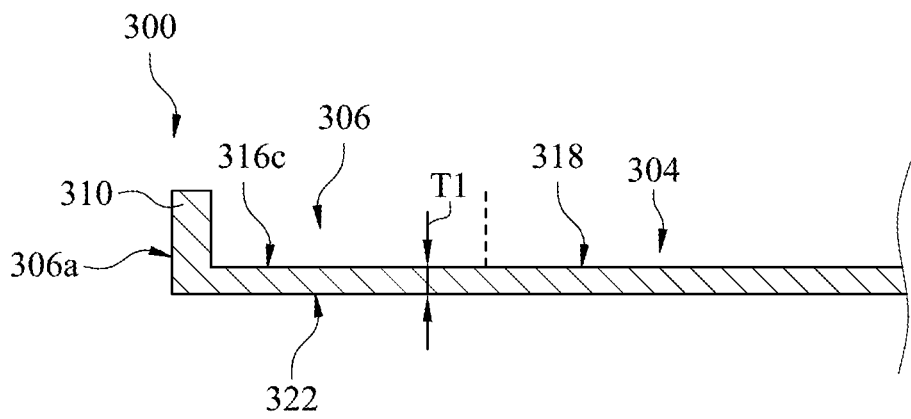
FIG. 3B illustrates the example of the transfer blade as shown in FIG. 3A, in accordance with some embodiments of the present disclosure.

FIG. 3B illustrates a cross-sectional view of the transfer blade 300 taken along line 3B-3B as shown in FIG. 3A. As shown in FIG. 3B, the transfer blade 300 has a first thickness T1 that extends from the third surface 316*c* to a seventh surface 322 opposite to the third surface 316*c*. The seventh surface 322 is opposite to the first, second, third, fourth, fifth, and sixth surfaces 316*a*, 316*b*, 316*c*, 314*a*, 314*b*, 318 of the first end segment 302, the intermediate segment 304, and the second end segment 306, respectively. As shown in FIG. 3B, the intermediate segment 304 has the first thickness T1 as well such that the third surface 316*c* and the sixth surface 318 are portions of one continuously and unimpeded unitary surface extending along of the transfer blade 300.

Figure 3C:
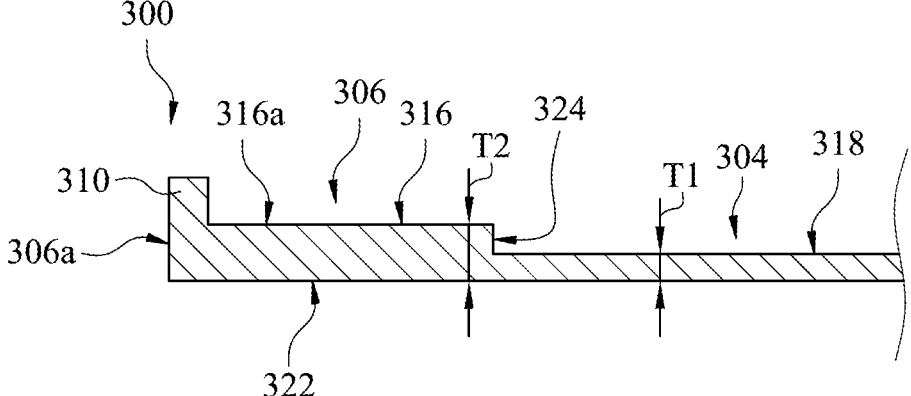
FIG. 3C illustrates the example of the transfer blade as shown in FIG. 3A, in accordance with the embodiments of the present disclosure.

FIG. 3C illustrates a cross-sectional view of the transfer blade 300 taken along line 3C-3C as shown in FIG. 3A. As shown in FIG. 3C, the transfer blade 300 has a second thickness T2 extending from the first surface 316*a* to the seventh surface 322. The second thickness T2 is greater than the first thickness T1. A first sidewall 324 extends from the sixth surface 318 to the first surface 316*a*. The sidewall 324 has a height that is a difference between the second thickness T2 minus the first thickness T1.

Figure 3D:
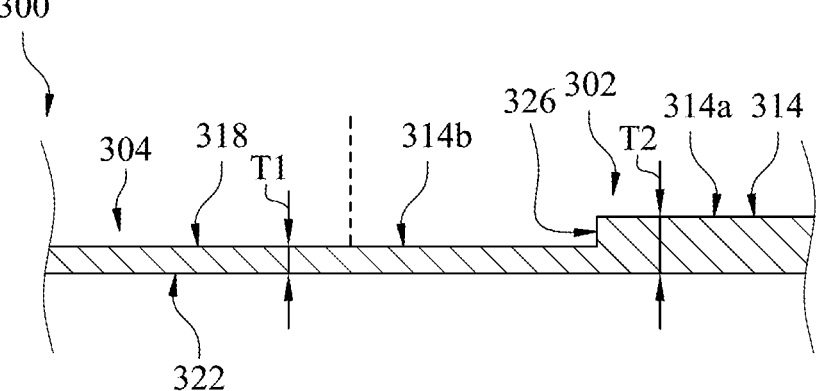
FIG. 3D illustrates the example of the transfer blade as shown in FIG. 3A, in accordance with the embodiments of the present disclosure.
Figure 3E:
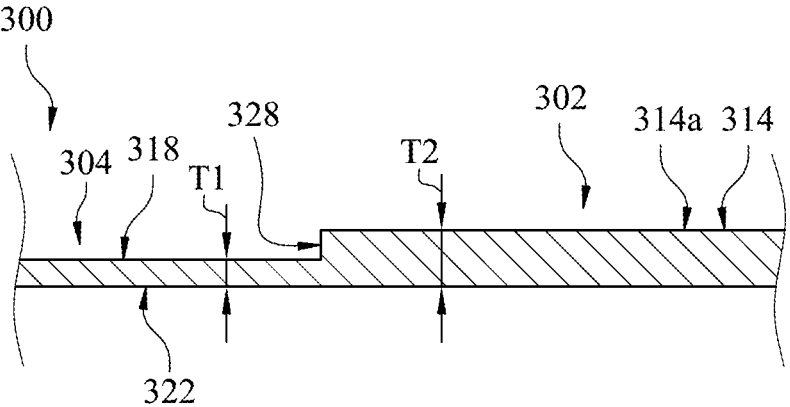
FIG. 3E illustrates the example of the transfer blade as shown in FIG. 3A, in accordance with the embodiments of the present disclosure.

FIG. 3D illustrates a cross-sectional view of the transfer blade 300 taken along line 3D-3D as shown in FIG. 3A. As shown in FIG. 3D, the transfer blade 300 has the first thickness T1 between fifth surface 314*b* and the seventh surface 322 and the second thickness T2 between the fourth surface 314*a* and the seventh surface 322. A second sidewall 326 extends from fourth surface 314*a* to the fifth surface 314*b*. The second sidewall 326 has a height that is a difference between the second thickness T2 minus the first thickness T1. In other words, the first sidewall 324 and the second sidewall 326 are substantially equal in height. In this embodiment, the portions of the transfer blade aligned with the third surface 316*c*, the fifth surface 314*b*, and the sixth surface 318 all have the first thickness T1 such that the third surface 316*c*, the fifth surface 314*b*, and the sixth surface 318 are al portions of one continuously and unimpeded unitary surface extending along of the transfer blade 300. FIG. 3E illustrates a cross-sectional view of the transfer blade 300 taken along line 3E-3E as shown in FIG. 3A. As shown in FIG. 3E, the transfer blade 300 has the first thickness T1 between the sixth surface 318 and the seventh surface 322 and the second thickness T2 between the fourth surface 314*a* and the seventh surface 322. A third sidewall 328 extends from the sixth surface 318 to the fourth surface 314*a*. The third sidewall 328 has a height that is a difference between the second thickness T2 minus the first thickness T1. In other words, the first sidewall 324, the second sidewall 326, and the third sidewall 328 are substantially equal in height.

In some embodiments, thicknesses of respective portions of the transfer blade 300 aligned with the third surface 316*c*, the fifth surface 314*b*, and the sixth surface 318 may be different from each other. However, while these thicknesses of the respective portions of the transfer blade 300 may be different from each other, the first surface 316*a*, the second surface 316*b*, and the fourth surface 314*a* will be substantially level or coplanar with each other such that the workpiece remains horizontal or level when present on the transfer blade 300.

Figure 4:
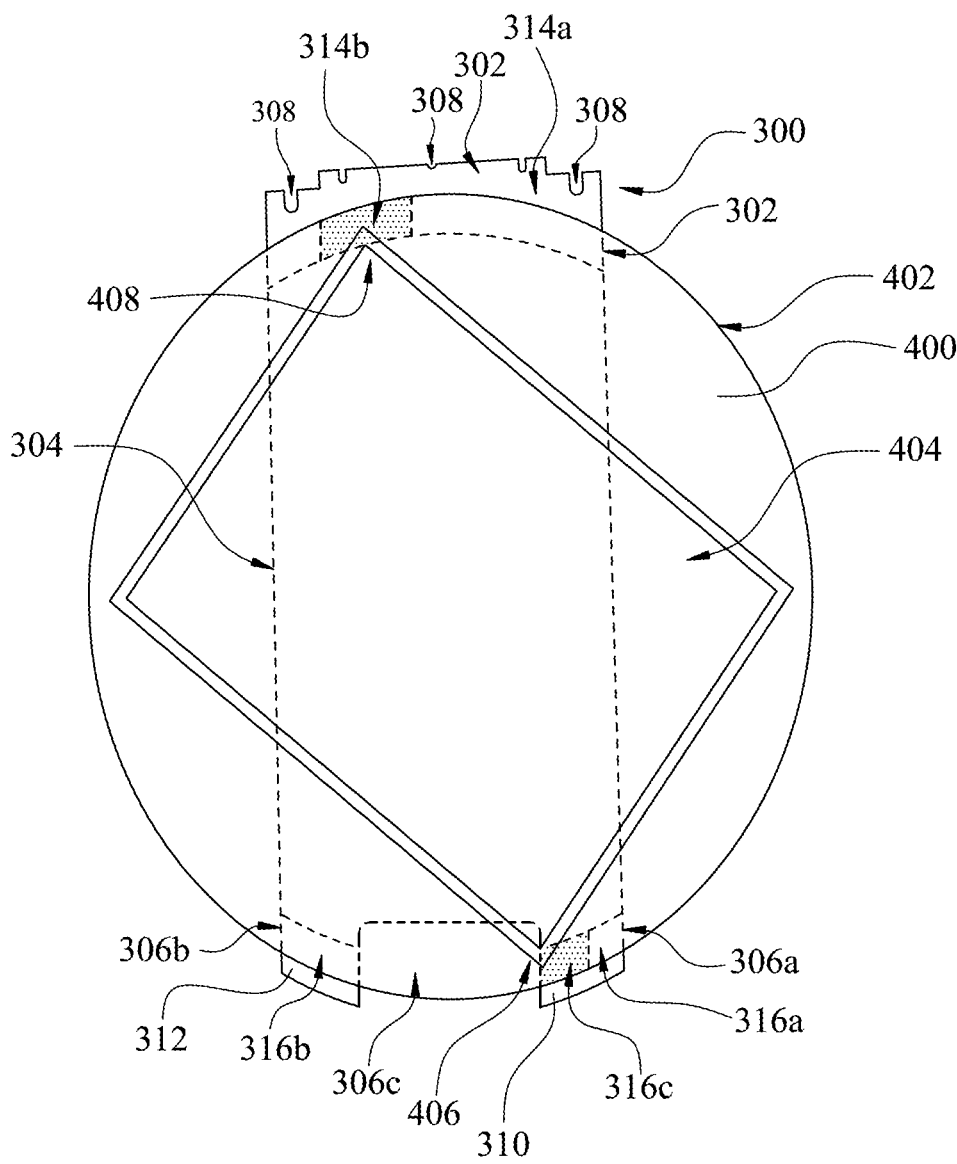
FIG. 4 illustrates an example of a workpiece on the example of the transfer blade as illustrated in FIGS. 3A-3E, in accordance with the embodiments of the present disclosure.

FIG. 4 illustrates a workpiece 400, which may be a silicon wafer or a tool component, on the transfer blade 300. For purposes of the following discussion, the workpiece 400 will be a wafer, however, the workpiece 400 may be a tool component or any other type of structure known within the semiconductor device manufacturing industry that may be readily moved from a first location to a second location utilizing the transfer blade 300 when mounted to a transfer robot.

As shown in FIG. 4, a backside surface (e.g., a lower surface of the workpiece 400 not readily visible in FIG. 4) of the workpiece 400 overlaps and contacts the first and second contact regions 314, 316 of the first and second end segments 302, 306 of the transfer blade 300. For example, the backside surface of the workpiece 400 is physically contacting the first surface 316*a*, the second surface 316*b*, and the fourth surface 314*a* of the transfer blade 300. The backside surface also overlaps the third surface 316*c*, the fifth surface 314*b*, and the sixth surface 318 of the transfer blade 300. However, unlike the first, second, and fourth surfaces 316*a*, 316*b*, 314*a*, an area of the backside surface overlapping the third surface 316*c*, the fifth surface 314*b*, and the sixth surface 318 is suspended over the third, fifth, and sixth surfaces 316*c*, 314*b*, 318 such that a continuous and unimpeded unitary space (not shown) extends from the third, fifth, and sixth surfaces 318 to the backside surface of the workpiece 400. This unitary space (not shown) separates the backside surface from the third, fifth, and sixth surfaces 316*c*, 314*b*, 318, respectively, such that the backside surface does not contact the third, fifth, and sixth surfaces 316*c*, 314*b*, 318. Instead, the backside surface of the workpiece 400 is suspended over the third, fifth, and sixth surfaces 316*c*, 314*b*, 318.

An edge 402 of the workpiece 400 contacts the first and second hooks 310, 312 as shown in FIG. 4. As discussed earlier, the first and second hooks 310, 312 at least partially delimit movement of the workpiece 400 on the transfer blade 300 such that the workpiece 400 does not fall off the transfer blade 300 when moving the workpiece 400 from a first location to a second location different from the first location. While the transfer blade 300 is not entirely shown in FIG. 4 as the transfer blade 300 is at least partially underneath the workpiece 400, the transfer blade 300 may include another structure at the first end segment 302 that delimits movement of the workpiece 400 in an opposite direction to that of the first and second hooks 310, 312 to hold the workpiece 400 in a stationary position relative to the transfer blade 300.

The workpiece 400 further includes a sensitive or critical region or portion 404, which may be an extreme-ultraviolet (EUV) frame. For the purposes of the following discussion, the sensitive or critical region or portion 404 will be referred to as an EUV frame 404.

As shown in FIG. 4, the EUV frame 404 is substantially rectangular in shape. The EUV frame 404 may be an area to be patterned with EUV radiation and processed to form semiconductor devices utilizing the workpiece 400. In some other alternative embodiments, when the workpiece 400 is a tool component, the EUV frame 404 may instead be an EUV reticle that includes a pattern from which extreme ultraviolet light is reflected or through which EUV light is passed through to pattern a wafer aligned with the EUV reticle of the tool component. However, for purposes of brevity and simplicity of the present disclosure, the critical or sensitive region or portion 404 will be referred to as the EUV frame 404.

As shown in FIG. 4, the EUV frame 404 overlaps the third surface 316c, the fifth surface 314b, and the sixth surface 318, and the EUV frame 404 does not overlap the first surface 316a, the second surface 316b, and the fourth surface 314a. In other words, an area of the backside surface of the workpiece 400 overlapping and aligned with the EUV frame 404 does not contact the transfer blade 300. Instead, only areas of the backside surface of the workpiece 400 that are not aligned with or do not overlap with the EUV frame 404 contact the first, second, and fourth surfaces 316a, 316b, 314a of the transfer blade 300.

The EUV frame 404 further includes a first corner 406 and a second corner 408 that is diagonally opposite to the first corner 406. When the workpiece 400 is on the transfer blade 300, the first corner 406 overlaps and is aligned with the third surface 316c and the second corner 408 overlaps and is aligned with the fifth surface 314b. In other words, areas or locations of the backside surface of the workpiece 400 aligned with the first and second corners 406, 408 of the EUV frame 404 do not contact the transfer blade 300 as respective spaces extend from the third surface 316c and the fifth surface 314b to these areas of the backside surface.

Figure 5:
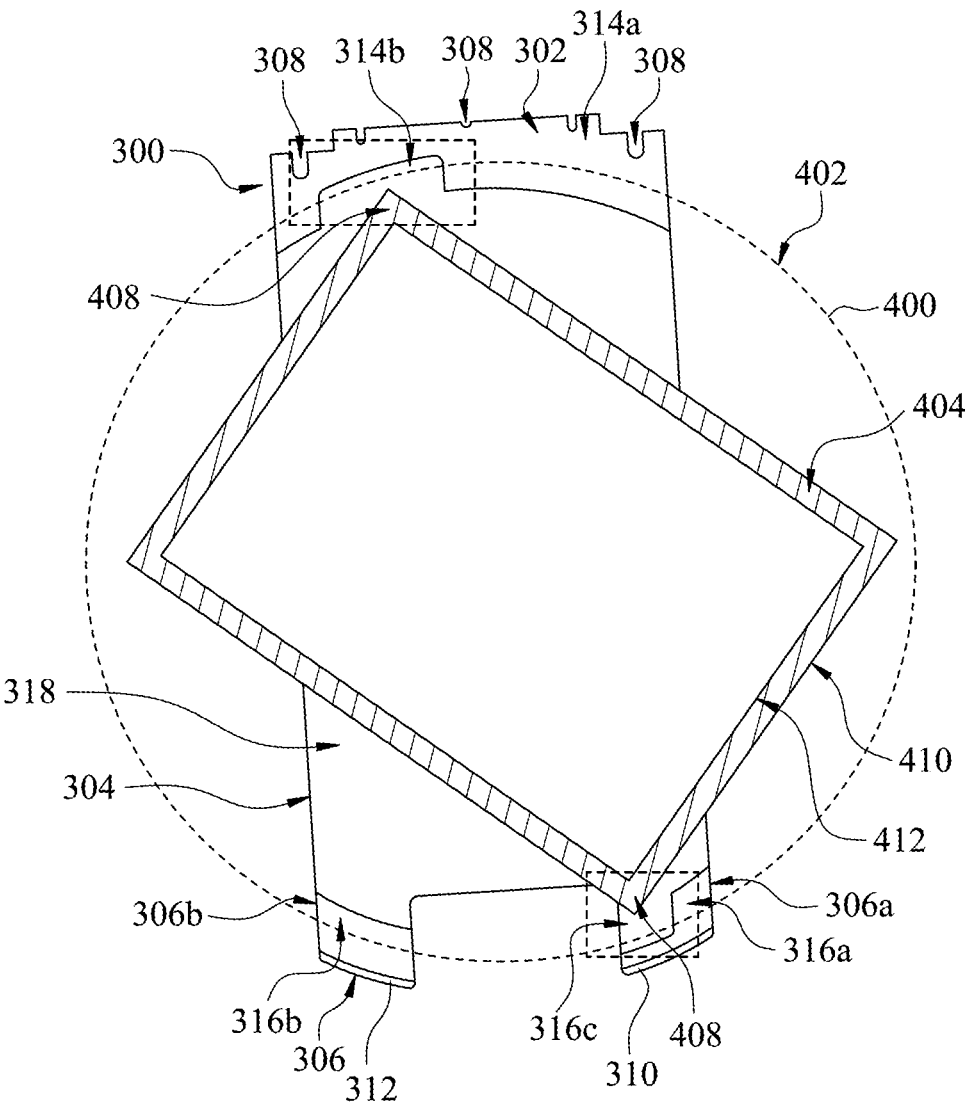
FIG. 5 illustrates an example of a workpiece on the example of the transfer blade as illustrated in FIGS. 3A-3E, in accordance with the embodiments of the present disclosure.

FIG. 5 illustrates the workpiece 400 on the transfer blade 300 with the outer portion of the workpiece 400 hidden (e.g., represented by the circular dotted line) such that features of the transfer blade 300 may be more readily visible in FIG. 5 with respect to the EUV frame 404. As shown in FIG. 5, the EUV frame 404 of the workpiece 400 has a first area 410, which is larger than a second area 412 that is representative of an EUV frame of a workpiece that may be utilized with the transfer blade 100. The second area 412 is smaller than the first area 410 as the transfer blade 100 does not include the third surface 316c and the fifth surface 314b. Since the transfer blade 100 does not include the third surface 316c and the fifth surface 314b that are recessed relative to the first surface 316a, the second surface 316b, and the fourth surface 314a, the EUV frame represented by the second area 412 can only be made so large while avoiding having areas of the backside surface of the workpiece aligned with the second area 412 of the EUV frame from overlapping and physically contacting the respective contact regions 114, 116 of the transfer blade 100. Unlike the transfer blade 100, the transfer blade 300 of the present disclosure includes the third surface 316c and the fifth surface 314b that are both recessed relative to the first, second, the fourth surfaces 316a, 316b, 314a such that the first area 410 of the EUV frame 404 may be made larger than the second area 412 as the first and second corners 406, 408 of the EUV frame 404 may readily overlap and be aligned with the third surface 316c and the fifth surface 314b. In other words, the third surface 316c and the fifth surface 314b being recessed relative to first, second, and fourth surfaces 316a, 316b, 314a allows for the first area 410 to be optimized (e.g., made larger) as compared to the second area 412. The first area 410 being larger than the second area 412 allows for greater efficiency and reduced waste as the number of semiconductor devices that may be manufactured with a single one of the workpieces 400 may be increased when utilizing the transfer blade 300 instead of utilizing the transfer blade 100.

As shown in FIG. 5, the first area 410 surrounds and encloses the second area 412. The cross-hatched region extending around the perimeter of the second area 412 is the additional area of the first area 410 that extends outward from the outer perimeter the second area 412. In other words, as discussed above, the first area 410 is larger than the second area 412.

Figure 6:
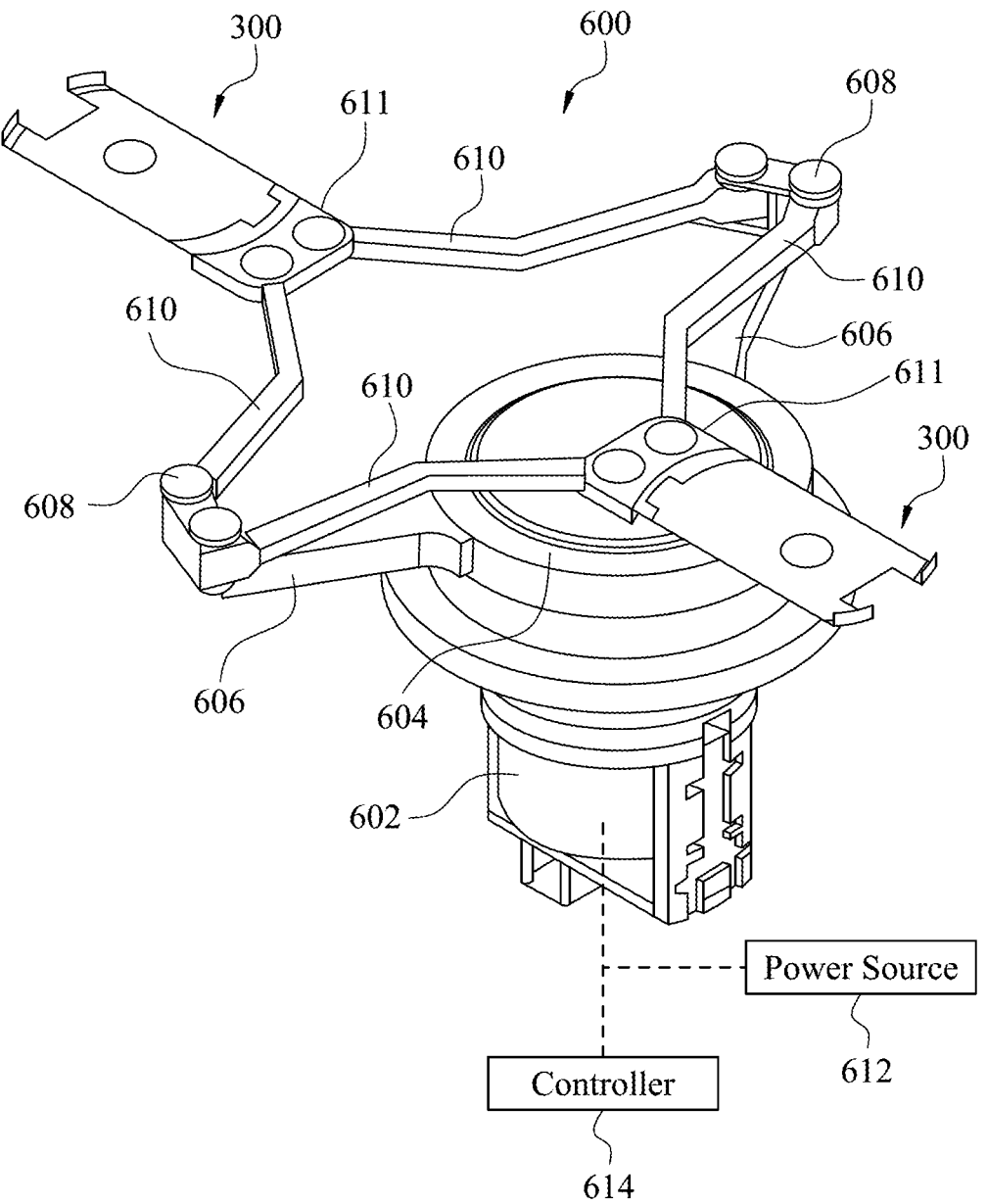
FIG. 6 illustrates an example of a robot including one or more of the embodiment of the transfer blade as illustrated in FIGS. 3A-3E, in accordance with the embodiments of the present disclosure.

FIG. 6 is directed to a robot 600 including a pair of the transfer blades 300 that are opposite to each other. The robot 600 further includes a motor 602 in mechanical cooperation with a hub 604. For example, the motor 602 rotates the hub 604 in either a clockwise direction, a counterclockwise direction, or both.

A pair of mount members 606 are coupled to the hub 604. For example, the pair of mount members 606 are fixedly coupled to the hub 604 such that the mount members 606 rotate with the hub 604 when rotated by the motor 602.

A pair of elbow bearings 608 are coupled to the pair of mount members 606 and a plurality of elbow arms 610, which may be referred to as elbow arms herein, are coupled to the pair of elbow bearings 608. The elbow bearings 608 may be in mechanical cooperation with the motor 602 such that the elbow bearings 608 may rotate in a clockwise direction, a counterclockwise direction, or both to move the elbow arms 610 inwards towards the hub 604 such that the pair of transfer blades 300 move outward and away from the hub 604 in a first direction. Similarly, the elbow bearings may be rotated in a clockwise direction, a counterclockwise direction, or both to move the elbow arms outwards and away from the hub 604 such that the pair of transfer blades 300 move inwards and towards the hub 604 in a second direction opposite to the first direction. This movement and actuation of the pair of transfer blades 300 of the transfer robot 600 may be utilized to move a number of the workpieces 400 as shown in FIGS. 4 and 5 of the present disclosure consecutively and in succession during a manufacturing process to pattern or process the EUV frame 404 of the workpieces 400, respectively.

A pair of pivot assemblies 611 are coupled between the pair of transfer blades 300 and respective ends of the elbow arms 610. The pair of pivot assemblies 611 are configured to maintain the pair of transfer blades 300 in a position in which the transfer blades 300 remain level with respect to the elbow arms 610, and the pair of pivot assemblies 611 are configured to pivot to allow the movement of the transfer blades 300 outwards from the hub 604 and inwards towards the hub 604 as discussed directly above. In other words, the pivot assemblies 611, the elbow arms 610, the elbow bearings 608, the mount members 606, the hub 604, and the motor 602 are in mechanical cooperation with each other to allow the movement of the transfer blades 300 as discussed directly above for transferring workpieces or tool components utilizing the transfer robot 600.

A power source 612 and a controller 614 are in electrical communication with the motor 602 of the robot 600. The power source 612 may be an external power source such as a wall outlet or may be an internal power source such as a battery within the motor 602. The controller 614 may be a computer, a microprocessor, a processor, or some other type of controller that may readily send and receive electrical signals to and from the robot 600. For example, the controller 614 may include a memory or be in electrical communication with a memory that contains instructions that are sent as electrical signals to the motor 602 to control the actuation (e.g., displacement) of the pair of transfer blades 300 through the actuation (e.g., rotation) of the hub 604 utilizing the motor 602.

Figure 7:
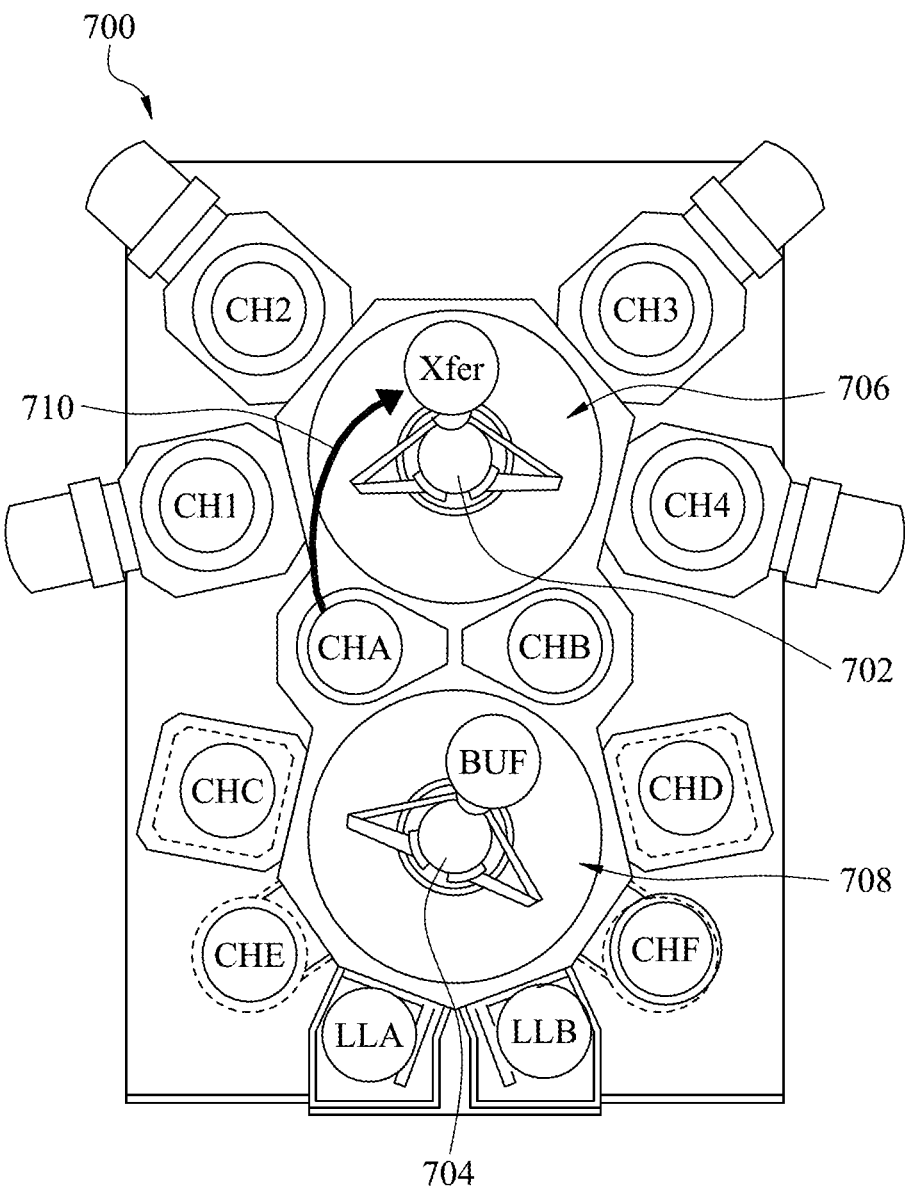
FIG. 7 illustrates an example of a processing apparatus or tool in which the example of the robot including one or more of the example of the transfer blade as illustrated in FIG. 6, in accordance with the embodiments of the present disclosure.

FIG. 7 is a semiconductor device manufacturing tool 700 including a first robot 702 and a second robot 704 within the manufacturing tool 700. Each of the first and second robots 702, 704 may include features the same or similar to those of the robot 600 as shown in FIG. 6. However, unlike the robot 600 as shown in FIG. 6, the first and second robots 702, 704 each only have a single one of the transfer blades 300 instead of a pair of the transfer blades 300.

The first robot 702 is in a first chamber 706 and the second robot 704 is in a second chamber 708. The first chamber 706 and the second chamber 708 may be separated from each other. However, workpieces or tool components, which may be similar to the workpieces 400 as shown in FIGS. 4 and 5 of the present disclosure, may readily be passed between chambers through a CHA and CHB region within the manufacturing tool 700. Several more internal regions (e.g., CHC, CHD, CHE, CHF, LLA, LLB, BUF, CH1, CH2, CH3, CH4, Xfer, etc.) may be present within the manufacturing tool 700, and each one of these internal regions within the manufacturing tool 700 may carry out a process known within the semiconductor industry to further refine a number of workpieces consecutively and in succession to manufacture semiconductor devices. The first and second robots 702, 704 may be utilized to transfer the number of workpieces between these various internal regions to manufacture semiconductor devices.

Figure 8:
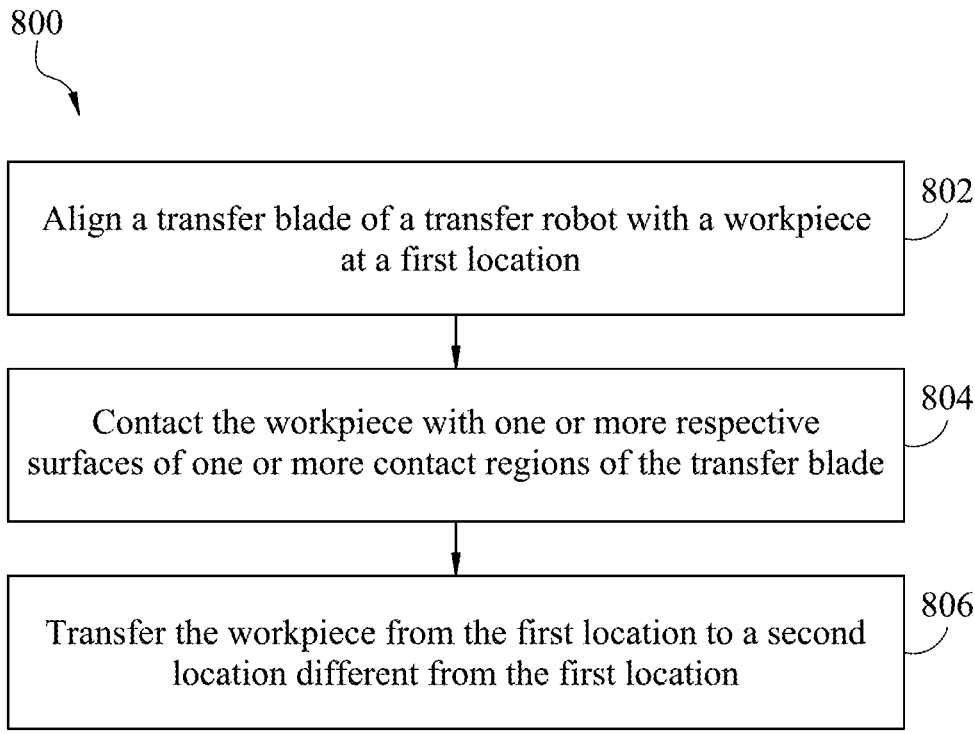
FIG. 8 illustrates an example of a method of transferring a workpiece, in accordance with some embodiments of the present disclosure.

FIG. 8 is directed to a block diagram 800 illustrating a workpiece being transferred from the CHA region to the Xfer region and then to another one of the CH1, CH2, CH3, or CH4 regions within the manufacturing tool 700 by the first robot 702. An arrow 710 in FIG. 7 illustrates the transfer blade 300 of the first robot 702 picking up a workpiece present within the CHA region and transferring the workpiece from the CHA region to another region that the first robot 702 may readily access. For example, the first robot 702 may readily access the CHA, CHB, CH1, CH2, CH3, and CH4 regions whereas the second robot 704 may readily access the CHA, CHB, CHC, CHD, CHE, CHF, LLA, and LLB regions. The CHA, CHB, CHC, CHD, CHE, CHF, LLA, LLB, CH1, CH2, CH3, and CH4 may be chambers of the manufacturing tool 700 in which workpieces may be positioned within during the manufacturing process to be refined and processed utilizing the manufacturing tool 700.

In a first step 802, the transfer blade 300 of the first robot 702 is aligned with a workpiece within the CHA region. For example, the transfer blade 300 may be positioned underneath the workpiece within the CHA region by rotating the first robot 702 and inserting the transfer blade 300 into the CHA region underneath the workpiece.

In a second step 804, after the transfer blade 300 of the first robot 702 has been aligned with the workpiece, portions of the transfer blade 300 are brought into contact with the workpiece. For example, the respective surfaces 316a, 316b, 314a of the first and second contact regions 314, 316 are brought into contact with the backside surface of the workpiece by lifting the transfer blade 300 up to the backside surface of the workpiece such that the transfer blade 300 contacts portions of the backside surface of the workpiece. The respective surfaces 316a, 316b, 314a (e.g., raised surfaces) of the first and second contact regions 314, 316 are level or coplanar with each other such that the workpiece is level or horizontal when present on the transfer blade 300 due to gravity.

Other respective surfaces of the transfer blade 300, such as respective surfaces 316c, 314b, 318 (e.g., recessed surfaces) described above with reference to FIG. 3A-3E do not come into contact with the backside surface of the workpiece. Instead, these respective surfaces 316c, 314b, 318 are spaced apart from the backside surface of the workpiece such that these respective surfaces 316c, 314b, 318 do not contact the backside surface of the workpiece reducing the likelihood of defects on the backside surface of the workpiece at areas of the backside surface of the workpiece overlapping these respective surfaces 316c, 314b, 318. The transfer blade 300 may continue to lift up the workpiece off a support structure on which the workpiece was previously supported by within the CHA region.

In a third step 806, the transfer blade 300 removes the workpiece from within the CHA region. At which point the transfer blade 300 of the first robot 702 is rotated to transfer the workpiece from the CHA region to another one of the respective regions (e.g., CHB, CH1, CH2, CH3, CH4) that the first robot 702 may readily access within the manufacturing tool 700. For example, after the workpiece is removed from the CHA region, the workpiece is present in the Xfer region on the transfer blade 300. Once removed from the CHA region and in the Xfer region, the transfer blade 300 of the first robot 702, which is carrying the workpiece, is rotated (e.g., clockwise or counterclockwise) such that the transfer blade 300 is aligned with the CH1 region, and, once the transfer blade 300 carrying the workpiece is aligned with the CH1 region, the transfer blade 300 of the first robot 702 is actuated into the CH1 region such that the workpiece may be positioned within the CH1 region for processing of the workpiece utilizing the manufacturing tool 700. For example, the workpiece may be stationarity and positioned on a structure within the CH1 region for further processing of the workpiece. Alternatively, the workpiece may instead remain present on the transfer blade within the CH1 region while further processing of the workpiece occurs. This further processing may be exposing an EUV frame of the workpiece to an EUV light through an EUV reticle to pattern the EUV frame of the workpiece.

While the above discussion focuses on moving a workpiece or tool component from the CHA region to the CH1 region within the manufacturing tool 700, the above method may be adapted to move the workpiece or tool component within the manufacturing tool 700 from any one of the respective regions (e.g., CHA, CHB, CHC, CHD, CHE, CHF, LLA, LLB, BUF, Xfer, CH1, CH2, CH3, or CH4) within the manufacturing tool 700 to another one of the respective regions within the manufacturing tool 700 utilizing the first robot 702 and the second robot 704, respectively.

As is readily apparent in view of the above discussion, the transfer blade 300 of the present disclosure as shown in FIGS. 3A-3E is advantageous over the transfer blade 100 as shown in FIG. 1. For example, as discussed earlier, the third surface 316c, the fifth surface 314b, and the sixth surface 318 of the transfer blade 300 allow for the sensitive or critical region or portion 404 (e.g., EUV frame, EUV reticle, etc.) of the workpiece 400 to be larger than a sensitive or critical region or portion of a workpiece that may be utilized with the transfer blade 100. If the workpiece 400 with the larger sensitive or critical region or portion 404 was utilized with the transfer blade 100, the respective corners 406, 408 of the sensitive or critical region or portion 404 would overlap the respective surfaces 116a, 114a of the transfer blade 100 significantly increasing the likelihood of defects on the backside surface of the workpiece 400 at locations overlapping and aligned with the sensitive or critical region or portion 404. Whereas if the workpiece 400 with the larger EUV frame 404 was utilized with the transfer blade 300 of the present disclosure, the respective corners 406, 408 of the sensitive or critical region or portion 404 would overlap the respective surfaces 316c, 314b, 318 of the transfer blade 300 such that the locations of the backside surface overlapping and aligned with the sensitive or critical region or portion 404 would not contact the transfer blade 300 significantly reducing the likelihood of defects on the backside surfaces of the workpiece 400 at these locations overlapping and aligned with the sensitive or critical region or portion 404. In other words, the sensitive or critical region or portion 404 of the workpiece 400 that may be utilized with the transfer blade 300 may be larger in size as compared to workpieces with a sensitive or critical region or portion that may readily be utilized with the transfer blade 100. To summarize, the larger sensitive or critical region or portion 404 of the workpiece utilized with the transfer blade 300 of the present disclosure allows for a greater number of semiconductor devices to be manufactured more efficiently and with reduced waste as compared to manufacturing semiconductor devices utilizing a workpiece with a smaller sensitive or critical region or portion with the transfer blade 100.

As is readily apparent in view of the above discussion, when the sensitive or critical region or portion 404 is an EUV reticle of a tool component instead of the EUV frame 404 of the workpiece 400, locations and areas of the backside surface of the EUV reticle do not contact respective surfaces of the transfer blade 300 reducing the likelihood of defects (e.g., scratches, indentions, recesses, etc.) on the backside surface of the EUV reticle caused by debris on the transfer blade 300. The EUV reticle of the tool component may be utilized to pattern a surface of a wafer when an EUV light is passed through the EUV reticle, which has a pattern to form the pattern on the surface of the wafer. The EUV reticle of the tool component that may be transferred by the transfer blade 300 of the present disclosure will have a larger area as compared to an EUV reticle of a tool component that may be transferred by the transfer blade 100.

The above increase in size of the sensitive or critical region or portion 404 or the workpiece 400 or tool component allows for a greater number of semiconductor devices to be manufactured utilizing the workpiece 400 or tool component reducing the overall waste while also improving efficiency of the manufacturing process of the semiconductor devices. For example, when the larger EUV frame 404 or the larger EUV reticle is utilized as a result of utilizing the transfer blade 300 of the present disclosure instead of utilizing the transfer blade 100, a greater number of semiconductor devices may be manufactured more efficiently and quickly with reduced waste as compared to smaller EUV frames and smaller reticles that may be utilized with the transfer blade 100.

To summarize, the additional recessed surfaces 316c, 314b of the transfer blade 300 as compared to the transfer blade 100, which does not have these additional recessed surfaces, allows for the manufacturing process of semiconductor devices to be more efficient, reduces the likelihood of defects on backside surfaces of workpieces or tool components overlapping sensitive or critical regions or portions of the workpieces or tool components, and reduces the amount of waste when manufacturing the semiconductor devices as there are likely fewer defective semiconductor devices manufactured and a greater number of semiconductor devices may be formed per wafer.

At least one embodiment of a blade, a robot blade, or a transfer blade of the present disclosure may be summarized as comprising a first end segment; a second end segment opposite to the first end segment; an intermediate segment extending from the first end segment to the second end segment; a first raised contact region at the first end segment, the first raised contact region including one or more first raised surfaces; a second raised contact region at the second end segment, the second raised contact region including one or more second raised surfaces; and a recessed region including a first portion that extends into the first raised contact region and is on the first end segment, a second portion that extends into the second raised contact region and is on the second end segment, a third portion that extends from the first portion to the second portion along the intermediate segment and is on the intermediate segment, and one or more recessed surfaces extending along the first portion, the second portion, and the third portion. Wherein the one or more recessed surfaces are recessed relative to the one or more first and second raised surfaces, and the one or more first and second raised surfaces are raised relative to the one or more recessed surfaces At least one embodiment of a robot or a transfer robot of the present disclosure may be summarized as comprising a motor; a hub bearing in mechanical cooperation with the motor, the hub bearing configured to be rotated by the motor; a mount member coupled to the hub bearing, the mount member extending outward from the hub bearing to an end of the mount member; an elbow bearing coupled to the end of the mount member; an elbow arm coupled to the elbow bearing; and a blade coupled to the elbow arm, the blade including: a first end segment, a second end segment opposite to the first end segment, an intermediate segment extending from the first end segment to the second end segment, a first raised contact region at the first end segment, a second raised contact region at the second end segment, and a recessed region. The recessed region including a first portion that extends into the first raised contact region and is on the first end segment, a second portion that extends into the second raised contact region and is on the second end segment, and a third portion that extends from the first portion to the second portion along the intermediate segment and is on the intermediate segment. Wherein respective surfaces of the first and second raised contact regions are configured to physically contact a surface of a workpiece being transferred from a first location to a second location by the robot utilizing the blade, and a respective surface of the recessed region is spaced apart from the surface of the workpiece At least one embodiment of a method of transferring a workpiece of the present disclosure may be summarized as comprising aligning selected locations at a surface of a workpiece with one or more raised contact regions of a blade of a robot; aligning a recessed region of the blade of the robot with a critical region of a workpiece to space apart a recessed surface of the recessed region from the surface of the workpiece; and entirely overlapping the critical region of the workpiece with the recessed region.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A blade, comprising:
a first end segment;
a second end segment opposite to the first end segment;
an intermediate segment extending from the first end segment to the second end segment;
a first raised contact region at the first end segment, the first raised contact region including one or more first raised surfaces;
a second raised contact region at the second end segment, the second raised contact region including one or more second raised surfaces; and
a recessed region including:
a first portion that extends into the first raised contact region and is on the first end segment;
a second portion that extends into the second raised contact region and is on the second end segment;
a third portion that extends from the first portion to the second portion along the intermediate segment and is on the intermediate segment; and
one or more recessed surfaces extending along the first portion, the second portion, and the third portion,
wherein the one or more recessed surfaces are recessed relative to the one or more first and second raised surfaces, and the one or more first and second raised surfaces are raised relative to the one or more recessed surfaces, and
wherein, when a workpiece is present on the first contact region and the second contact region, the first portion of the recessed region overlaps a first corner of a critical region of the workpiece and the second portion of the recessed region overlaps a second corner of the critical region of the workpiece.

2. The blade of claim 1, wherein the first end segment includes a first extension and a second extension that is spaced apart from the first extension, and the first extension and the second extension extend outward from the intermediate segment.

3. The blade of claim 2, wherein:
the first portion of the recessed region is on the first extension; and
the first raised contact region is on the first extension and the second extension.

4. The blade of claim 1, further comprising:
a first hook at the first extension; and
a second hook at the second extension,
wherein the first hook and the second hook are configured to be adjacent to an edge of a workpiece to position the workpiece on the first raised contact region and the second contact region and align a critical region of the workpiece to only overlap the recessed region.

5. The blade of claim 3, wherein, when the workpiece is present on the first raised contact region and the second raised contact region, the critical region of the workpiece only overlaps the recessed region, the one or more first and second raised surfaces of the first and second raised contact regions contact a surface of the workpeice, and the one or more recessed surfaces are spaced apart from the surface of the workpiece.

6. The blade of claim 1, wherein the recessed region extends continuously along the first end segment, the second end segment, and the intermediate segment.

7. The blade of claim 1, wherein:
the first portion of the recessed region has a first surface area;
the second portion of the recessed region has a second surface area; and
the third portion of the recessed region has a third surface area greater than the first surface area and greater than the second surface area.

8. The blade of claim 7, wherein a sum of the first surface area and the second surface area is less than the third surface area.

9. The blade of claim 1, further comprising a surface opposite to the one or more first raised surfaces, the one or more second raised surfaces, and the one or more recessed surfaces, wherein:
the first end segment has a first thickness at the first portion of the recessed region extending between a corresponding one of the one or more recessed surfaces and the surface, and a second thickness at the first raised contact region extending between a corresponding one of the one or more first raised surfaces and the surface, the second thickness being greater than the first thickness;
the second end segment has the first thickness at the second portion of the recessed region extending between a corresponding one of the one or more recessed surfaces and the surface, and the second thickness at the second raised contact region extending between a corresponding one of the one or more second raised surfaces and the surface; and
the intermediate segment has the first thickness at the third portion of the recessed region extending between a corresponding one of the one or more recessed surfaces and the surface.

10. A robot, comprising:
a motor;
a hub bearing in mechanical cooperation with the motor, the hub bearing configured to be rotated by the motor;
a mount member coupled to the hub bearing, the mount member extending outward from the hub bearing to an end of the mount member;
an elbow bearing coupled to the end of the mount member;
an elbow arm coupled to the elbow bearing; and
a blade coupled to the elbow arm, the blade including:
a first end segment;
a second end segment opposite to the first end segment;
an intermediate segment extending from the first end segment to the second end segment;
a first raised contact region at the first end segment;
a second raised contact region at the second end segment; and
a recessed region including:
a first portion that extends into the first raised contact region and is on the first end segment;
a second portion that extends into the second raised contact region and is on the second end segment; and
a third portion that extends from the first portion to the second portion along the intermediate segment and is on the intermediate segment,
wherein respective surfaces of the first and second raised contact regions are configured to physically contact a surface of a workpiece being transferred from a first location to a second location by the robot utilizing the blade, and a respective surface of the recessed region is spaced apart from the surface of the workpiece.

11. The robot of claim 10, wherein a critical region of the workpiece only overlaps the recessed region of the blade.

12. The robot of claim 10, wherein:

the first portion of the recessed region has a first surface area;

the second portion of the recessed region has a second surface area; and the third portion of the recessed region has a third surface area greater than the first surface area and greater than the second surface area.

13. The robot of claim 12, wherein a sum of the first surface and the second surface area is less than the third surface area.

14. The robot of claim 10, wherein:

the first end segment has a first thickness at the first portion of the recessed region and a second thickness at the first raised contact region, the second thickness being greater than the first thickness;

the second end segment has the first thickness at the second portion of the recessed region and the second thickness at the second raised contact region; and the intermediate segment has the first thickness at the third portion of the recessed region.

15. A method, comprising:

aligning selected locations at a surface of a workpiece with one or more raised contact regions of a blade of a robot;

aligning a recessed region of the blade of the robot with a critical region of a workpiece to space apart a recessed surface of the recessed region from the surface of the workpiece; and placing the selected locations at the surface of the workpiece onto the one or more raised contact regions of the blade of the robot and overlapping the critical region of the workpiece with the recessed region, the surface of the workpiece including non-contact regions that are adjacent to the selected locations, and the non-contact regions remain spaced apart from the blade of the robot, and the non-contact regions being overlapped by the critical region.

16. The method of claim 15, further comprising transferring the workpiece from a first location to a second location utilizing the blade of the robot.

17. The method of claim 16, wherein transferring the workpiece from the first location to the second location includes:

lifting the workpiece by contacting the selected locations of the workpiece with the one or more raised contact regions of the blade; and moving the workpiece from the first location to the second location utilizing the blade of the robot.

18. The method of claim 15, wherein the selected locations are spaced laterally outward from the critical region of the workpiece.

19. The method of claim 1, further comprising a through hole that extends through the intermediate portion.

20. The blade of claim 3, wherein a first respective portion of the first raised contact region along the first extension is smaller than a second respective portion of the first raised contact region along the second extension.

* * * * *